United States Patent [19]

Glaeser et al.

[11] 4,041,138

[45] Aug. 9, 1977

[54] PROCESS FOR THE PREPARATION OF CRYSTALLINE POTASSIUM TANTALUM FLUORIDE

[75] Inventors: Wolfgang Glaeser; Wolfgang Mathy, both of Goslar, Germany

[73] Assignee: Hermann C. Starck, Berlin, Germany

[21] Appl. No.: 707,225

[22] Filed: July 21, 1976

[30] Foreign Application Priority Data

Aug. 21, 1975 Germany .............................. 2537354

[51] Int. Cl.$^2$ ........................ C01B 9/08; C01G 35/00; C01D 3/02
[52] U.S. Cl. ..................................... 423/464; 423/63; 423/658.5
[58] Field of Search ....................... 423/464, 658.5, 63

[56] References Cited

U.S. PATENT DOCUMENTS

| | | | |
|---|---|---|---|
| 2,795,481 | 6/1957 | Hicks et al. ............................ | 423/63 |
| 2,962,372 | 11/1960 | Foos et al. ............................. | 423/63 |
| 2,998,298 | 8/1961 | Scheller ................................. | 423/63 |
| 3,051,547 | 8/1962 | Bialecki ................................. | 423/63 |
| 3,065,046 | 11/1962 | Foos et al. ............................. | 423/63 |
| 3,653,850 | 4/1972 | Eberts .............................. | 423/464 X |
| 3,907,976 | 9/1975 | Hogan, Jr. et al. .................. | 423/464 |

*Primary Examiner*—Edward Stern
*Attorney, Agent, or Firm*—Hammond & Littell

[57] ABSTRACT

Potassium tantalum fluoride substantially free from compounds of silicon and niobium is prepared from a crude tantalum-niobium salt solution by use of aqueous hydrofluoric acid having a dissolved content of a silicon compound by mixing the salt solution with a water-insoluble organic solvent for said salts; extracting the organic phase with aqueous medium; mixing the organic phase with silicon-contaminated aqueous hydrofluoric acid; mixing the organic phase with a hot silicon-free solution of an ionizable potassium compound, and separating and cooling the aqueous phase thereby precipitating potassium tantalum fluoride. The phases are separated between steps.

12 Claims, No Drawings

PROCESS FOR THE PREPARATION OF CRYSTALLINE POTASSIUM TANTALUM FLUORIDE

FIELD OF THE INVENTION

The invention concerns a process for the preparation of silicon-free, crystalline potassium tantalum fluoride. The invention includes such a method wherein the hydrofluoric acid used in the purification operation has a substantial content of dissolved silicon, and the potassium tantalum fluoride is precipitated free from silicon from an aqueous solution.

BACKGROUND OF THE INVENTION

Tantalum metal is usually produced by reduction of potassium tantalum fluoride ($K_2TaF_7$) with metallic sodium. Potassium tantalum fluoride is therefore an important intermediate in the production of tantalum metal.

Production of the metal starts with tantalum ores or concentrates, which are dissolved in hydrofluoric acid; the tantalum goes into solution as the fluoride. The tantalum fluoride is extracted from the aqueous hydrofluoric acid solution in known manner by liquid-liquid extraction employing an organic extractant, after which the organic phase is separated. The tantalum is obtained from the organic phase in a form suitable for processing (i.e., as potassium tantalum fluoride) by precipitation with potassium fluoride; it is precipitated from organic solution. The purity of the potassium tantalum fluoride thus obtained is dependent essentially on the purity of the chemicals used.

If one prepares for example potassium tantalum fluoride according to German Pat. No. 1,018,037, wherein it is precipitated from solution in an organic solvent, traces of the latter remain on the potassium tantalum fluoride, so that the potassium tantalum fluoride must be recrystallized to effect further purification. Silicon impurities, however, are not substantially removed by such recrystallization.

Contamination by the organic solvent can be avoided according to U.S. Pat. No. 3,403,983 by steam distillation of the organic solution before precipitation. After the distillation, an aqueous solution of tantalum fluoride remains, from which the potassium tantalum fluoride can be crystallized by adding a potassium salt. This process is costly in terms of equipment and the amount of energy consumed.

The foregoing methods have the additonal disadvantage that the silicon contained, as an impurity, in the chemicals used for processing, is concentrated in the potassium tantalum fluoride. But potassium tantalum fluoride containing more than 15 p.p.m. by weight of silicon as Si is generally commercially unacceptable.

The known methods require therefore that chemicals with an extremely low silicon content be used for the preparation of usable potassium tantalum fluoride. The preparation of ammonium fluoride, potassium fluoride, potassium hydrogen fluoride, and hydrofluoric acid with extremely low silicon values is so costly, however, as to make their use commercially prohibitive.

OBJECTS OF THE INVENTION

A principal object of the invention is to eliminate the above-mentioned disadvantages.

A further object of the invention is to provide a method for the manufacture of high-purity potassium tantalum fluoride by a method wherein the principal reagents and particularly the hydrofluoric acid used may have a high content of soluble silicon.

A further object is to provide such a process which is economical with respect to the energy consumed and the apparatus required, which permits the potassium tantalum fluoride to be precipitated in pure, crystalline form from aqueous solution in simple manner and which permits the organic solvent to be recycled.

THE INVENTION

Surprisingly, it was found that when a tantalum-containing organic phase is mixed with a crude or technical-grade aqueous hydrofluoric acid solution, only the hydrofluoric acid in the solution is extracted by the organic phase, and that the impurities in the hydrofluoric acid, particularly silicon in the form of $H_2SiF_6$, are not extracted. They remain in the aqueous phase. Re-extraction of tantalum (i.e., the extraction of tantalum from the organic phase) can be prevented by a high hydrofluoric acid concentration in the aqueous phase, (i.e., by use of concentrated hydrofluoric acid).

It was further found that if the organic phase laden with hydrofluoric acid and tantalum is now heated together with pure water (preferably distilled or deionized water) the hydrofluoric acid is re-extracted and enters the water phase. Into the aqueous phase is now put an ionizable water-soluble potassium compound, e.g., potassium hydroxide, which is available silicon-free at a reasonable price. The aqueous phase is then mixed with the organic phase at a temperature above 50° C. The tantalum is thereby re-extracted from the organic phase (i.e., it is converted to potassium tantalum fluoride) but it remains in solution because the solution is hot. Temperatures of over 50° C., preferably 70° to 90° C. and particularly about 80° C., are suitable. The two phases are separated hot. When the aqueous phase is cooled, silicon-free potassium tantalum fluoride crystallizes out.

The final solution is preferably cooled sufficiently so that substantially all of the tantalum compound present is precipitated. This generally requires cooling below 50° C. and preferably the solution is cooled below 20° C.

In the process of the present invention, the preferred temperatures vary depending chiefly on the concentration and identity of the materials present. In each instance optimum concentrations and temperatures can be found most conveniently by laboratory trial.

In other words, the present invention provides a process for the production of substantially silicon-free potassium tantalum fluoride from a mixture of water-soluble tantalum and niobium salts by use of aqueous hydrofluoric acid having a substantial content of dissolved silicon, which comprises: mixing an aqueous hydrofluoric and sulfuric acid solution of tantalum and niobium salts with a water-insoluble organic solvent thereby extracting at least a portion of said salts from said aqueous solution; separating said organic solvent containing said salts from the residual aqueous solution; mixing said separated organic solvent with aqueous medium thereby selectively extracting substantially all of said niobium from said organic solvent; separating said organic solvent from the residual aqueous medium; mixing said separated organic solvent with aqueous hydrofluoric acid having a substantial content of dissolved silicon; separating the organic solvent from the hydrofluoric acid with which it is mixed; adding to said organic phase at a temperature in excess of 50° C. water and a silicon-free ionizable potassium compound in amount at least equivalent to the tantalum present; separating said aqueous solution; and cooling said aqueous solution thereby precipitating potassium tantalum fluoride therefrom substantially free from silicon.

According to the invention, it is therefore possible to obtain a high-purity, silicon-free crystalline potassium tantalum fluoride without additional recrystallization stages and by the use of low-cost potassium compounds directly after final separation of the organic and aqueous phases.

An important aspect of the invention is its direct applicability to decomposition solutions of tantalum ores or concentrates, from which niobium has been removed by washing, e.g., with sulfuric acid or water, where the remaining organic phase is laden with tantalum and hydrofluoric acid. Hydrofluoric acid can also be extracted from a silicon-containing hydrofluoric acid solution into the tantalum-containing organic phase. After the separation of the phases and re-extraction of the tantalum content with hot distilled water according to the above-described process, one obtains a silicon-free solution containing potassium tantalum fluoride.

The sulfuric acid used for the extraction is preferably of 5 to 30% strength. The hydrofluoric acid is preferably added to the solution in the proportion of at least seven mols per mol of tantalum present, and preferably is added in 100% excess thereover as a strong solution (e.g., 20 –30%) so as to extract substantially all of the tantalum. It may contain more than 1,000 p.p.m. of dissolved silicon.

Suitable potassium compounds include potassium chloride, potassium carbonate, potassium acetate and potassium bicarbonate in addition to potassium hydroxide. The potassium compound is preferably added in amount at least two mols per mol of tantalum fluoride present, and preferably is added in 10% excess.

The invention is further illustrated by the examples which follow. These examples are best embodiments of the invention and are not to be construed in limitation thereof.

EXAMPLE 1

The following illustrates the process of the invention wherein the starting solution has a substantial content of niobium, the hydrofluoric acid has a large content of dissolved silicon, and a nearly quantitative yield of crystalline potassium tantalum fluoride is obtained.

100 ml. of a solution of 80 g. per liter of tantalum and 65 g. per liter of niobium as Nb, which is 12 molar in HF and 3 molar in $H_2SO_4$, were mixed with 100 ml. of 100% tri-n-butyl phosphate. After the phases had settled, they were separated. The organic phase was washed three times, each with 100 ml. of 1 molar $H_2SO_4$ solution, whereby all the niobium with the exception of 21 50 ppm was removed from the organic phase. Then the organic phase was mixed with 20 ml. of 10 molar technical hydrofluoric acid solution (containing 2,000 p.p.m. of Si). The phases formed were separated after settling, and the organic phase was subsequently heated with 200 ml. of distilled water to over 60° C., preferably over 70° C. After the latter temperature was attained, the phases were mixed thoroughly. Then 6 g. of potassium hydroxide in tablet form was added. The phases were separated at a constant temperature and the separated aqueous phase was cooled to room temperature. On filtration of the aqueous phase 17 g. of crystalline $K_2TaF_7$ was recovered. It contained 10 p.p.m. of silicon as Si. The yield was 98.4% of the tantalum charge.

EXAMPLE 2

The following illustrates the process of the present invention wherein the extractions are performed by counter-current flow with production of a slightly purer tantalum product in slightly better yield.

20 liters of a tantalum-niobium solution containing hydrofluoric and sulfuric acids and containing 60 g. per liter of Ta and 50 g. per liter of niobium (prepared by dissolving a tantalum-niobium ore) was extracted with 20 liters of 100% of tri-n-butyl phosphate in known manner in mixer-settler boxes in counterflow. The niobium was washed out from the organic phase, likewise in known manner, in counterflow with $H_2SO_4$ solution. The organic phase was contacted in a mixer-settler box in direct flow with 5 liters of 20% technical hydrofluoric acid (containing 4,200 p.p.m. of Si). The organic phase was then conducted through a coalescer and thus liberated of droplets of the aqueous phase that had been carried along. The aqueous phase was removed. After passing through a heat exchanger in which the organic phase was heated to 80° C., it was contacted in two mixer-settler boxes with 20 liters of distilled water at 80° C. in which 25 g. per liter of KOH (added as tablets) was dissolved. The aqueous phases from the mixer-settlers were liberated of all traces of the organic phase. Then the aqueous phase was cooled slowly in a 60-liter tank to room temperature and 2.5 kg. of $K_2TaF_7$ was separated by decanting and centrifuging. It contained 8 p.p.m. of Si. The yield was 98 to 100% of theory.

EXAMPLE 3

The following illustrate the process of the present invention wherein the organic extractant contain a volatile hydrocarbon and the niobium is washed out with water.

2 liters of a hydrofluoric acid containing tantalum-niobium solution with a content of 35 g. per liter of tantalum and 65 g. per liter of niobium were mixed thoroughly with 3 liters of an organic phase (which consisted of 50% kerosene and 50% tri-n-butyl phosphate). The mixture was allowed to settle, and the phases were separated. All the niobium with the exception of less than 30 p.p.m. was washed out from the organic phase with distilled water, after which the organic phase was mixed with 0.5 liter of 40% technical hydrofluoric acid and separated again. Then the organic phase was heated together with 1.5 liters of distilled water to over 70° C. Into both phases was mixed 200 ml. of distilled water in which 45 g. of KOH was dissolved. After the phases had settled and separated, the aqueous phase was cooled. By filtering, 150 g. of $K_2TaF_7$ crystals were recovered. The yield was 98 to 100% of theory.

If hydrofluoric acid had been used for the preparation of potassium-tantalum fluoride according to German Pat. No. 1,018,037, as it was used in Examples 1, 2 and 3, the potassium-tantalum fluoride obtained would have had a silicon content of over 1,000 p.p.m.

We claim:
1. A process for the production of potassium tantalum fluoride substantially free from compounds of silicon and niobium by use of aqueous hydrofluoric acid having a substantial content of dissolved silicon, which comprises: mixing an aqueous hydrofluoric and sulfuric acid solution of tantalum and niobium salts with a water- insoluble organic solvent thereby extracting at least a portion of said salts from said aqueous solution; separating said organic solvent containing said salts from the residual aqueous solution; mixing said separate organic solvent with aqueous medium thereby selectively extracting substantially all of said niobium from said organic solvent; separating said organic solvent from the residual aqueous medium; mixing said separated organic solvent with aqueous hydrofluoric acid having a substantial content of dissolved silicon; separating the organic solvent from the hydrofluoric acid with which it is mixed; mixing said organic solvent with a silicon-free aqueous solution of an ionizable potassium compound at a temperature above 50° C.; separating said aqueous solution; and cooling said aqueous solution thereby precipitating crystalline potassium tantalum fluoride therefrom substantially free from silicon.

2. A process according to claim 1, wherein the water-insoluble organic solvent is tri-n-butyl phosphate.

3. A process according to claim 1, wherein the water-insoluble organic solvent is a 50:50 by weight tri-n-butyl phosphate; kerosene mixture.

4. A process according to claim 1, wherein the aqueous medium is distilled water.

5. A process according to claim 1, wherein the aqueous medium is sulfuric acid of 5 to 30 % strength.

6. A process according to claim 1, wherein the hydrofluoric acid solution with which the separated organic solvent is mixed is of about 20 to 30% strength by weight.

7. A process according to claim 1, wherein the aqueous hydrofluoric acid solution with which the separated organic solvent is mixed contains more than 1,000 p.p.m. of dissolved silicon.

8. A process according to claim 1, wherein the silicon-free potassium compound solution is formed by first mixing distilled water into said organic solvent and then adding said potassium compound to the mixture.

9. A process according to claim 1, wherein the potassium compound is potassium hydroxide.

10. A process according to claim 1, wherein the temperature of the mixture on addition of the potassium compound and on separation of the organic solution thereafter is in excess of 50° C.

11. A process according to claim 10, wherein the temperature of the mixture is in excess of 70° C.

12. A process according to claim 11, wherein the temperature of the solution on precipitation of the potassium tantalum fluoride is less than 20° C.

* * * * *